Jan. 13, 1931.    J. H. WILSON ET AL    1,788,817
COOKING UTENSIL AND METHOD OF MANUFACTURE
Filed Feb. 20, 1928
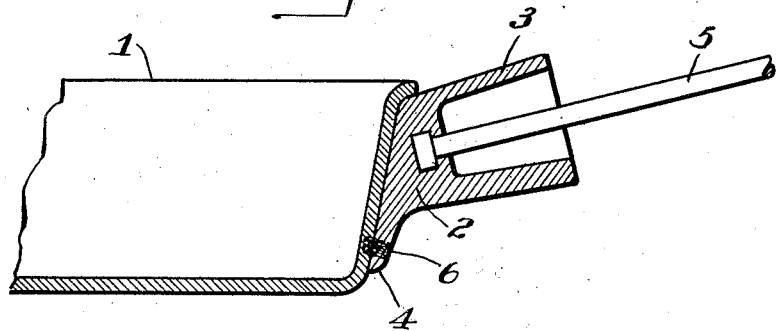
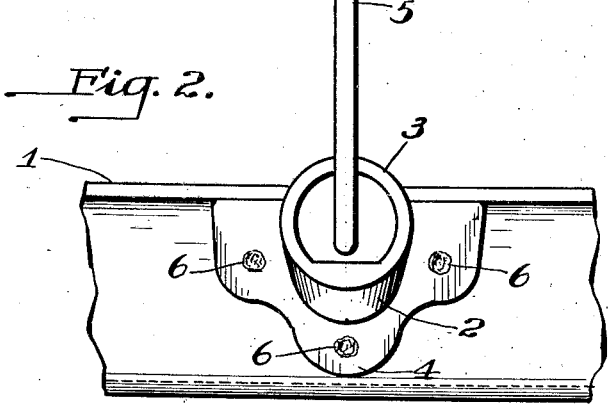
WITNESS
A. B. Wallace.
INVENTORS
John H. Wilson
Irving W. Wood
By Brown & Critchlow
their Attorneys.

Patented Jan. 13, 1931

1,788,817

UNITED STATES PATENT OFFICE

JOHN H. WILSON, OF NEW KENSINGTON, AND IRVING W. WOOD, OF PARNASSUS, PENNSYLVANIA, ASSIGNORS TO ALUMINUM COOKING UTENSIL COMPANY, OF NEW KENSINGTON, PENNSYLVANIA, A CORPORATION OF PENNSYLVANIA

COOKING UTENSIL AND METHOD OF MANUFACTURE

Application filed February 20, 1928. Serial No. 255,527.

The invention has to do with the forming of connections between wrought aluminum cooking utensils and cast aluminum handle-attaching members.

Heretofore such handle-attaching members, which because of their peculiar forms are made of cast aluminum, have been attached to wrought aluminum cooking utensils by aluminum rivets. Among other reasons, this is objectionable because the heads of the rivets protrude on the interiors of the utensils and interfere with their proper cleaning, and because the rivets so stretch that the handles loosen and that leaks develop around the rivets. Furthermore, the riveting of handles to aluminum utensils adds unduly to their costs of manufacture.

The object of this invention is to provide a method of fastening a cast aluminum handle-attaching member to a wrought aluminum cooking utensil, which affords a secure and durable connection free from the objectionable features of the prevailing rivet connections.

According to our invention, a connection between a cast aluminum handle-attaching member and a wrought aluminum cooking utensil is formed by electric resistance spot welding, an important feature of the invention being our discovery that to effect a secure, durable and otherwise satisfactory spot weld connection between these articles, the cast article must be made of an aluminum base alloy containing a substantial amount of silicon. If silicon is the only alloying constituent it should be present to the extent of from about 10 to 20 per cent, but if other alloying constituents are present the silicon may be as low as 7 or 8 per cent. The preferred aluminum base alloy is one containing about 15 per cent silicon.

We have attempted without success to spot weld to wrought aluminum cooking utensils, handle-attaching members made of many other cast aluminum base alloys. In such attempts, cracks radiated from the weld spots to the edges of the handle-attaching members, the electrodes left deep impressions on the wrought aluminum, and the weld connections were weak. As contrasted with these failures, we have found that when the handle-attaching member is made of an aluminum base alloy containing silicon within about the stated range, no cracks develop, the wrought utensil is free, or substantially free from impressions, or in fact any evidence of the spot welds, and the connection is very strong and durable.

The wrought aluminum utensil may be made from commercially pure aluminum, or from any of the various aluminum base alloys which may be rolled, forged, pressed, extruded or otherwise worked.

The invention will be further explained with reference to the accompanying drawings, of which Fig. 1 is an elevation of a portion of a wrought aluminum cooking utensil and a cast aluminum handle-attaching member connected to it; and Fig. 2 a sectional view taken on the line II—II, Fig. 1.

Having reference first to the drawings, a handle-attaching shank is illustrated as being connected to a wrought aluminum frying pan 1 according to the method here provided. The shank, which is cast, comprises a body portion 2, a socket 3 and a relatively narrow flange 4. In the body portion there is cast the inner headed end of a rod 5 which extends through a wooden handle in the customary manner, the inner end of the handle extending into the socket 3. The flange 4 is shaped to conform to the exterior surface of the utensil 1, and is connected thereto by a plurality of electric spot welds indicated at 6, the number of which may vary. The spot welding may be done by any suitable spot welding machine having electrodes which engage the inner surface of the utensil 1 and the outer surface of shank flange 4. We have found that when the shank is formed of an aluminum base alloy containing silicon in the amounts very strong spot welds may be effected without cracking the flange, and that the interior surface of the utensil is smooth at the weld spots.

According to the provisions of the patent statutes, we have explained the principle and mode of operation of our invention, and have given specific examples of its adaptability to different uses. However, we desire to have it understood that, within the scope of the appended claims, the invention may be practiced in the attaching of different forms of handle-attaching members to different forms of cooking utensils than specifically illustrated and described.

We claim as our invention:

1. The method of connecting a cast aluminum handle-attaching member to a wrought aluminum cooking utensil, comprising forming the handle-attaching member of an aluminum base alloy containing from about 7 per cent to 20 per cent silicon, and electrically spot welding it to the wrought aluminum utensil.

2. The method of connecting a cast aluminum handle-attaching member to a wrought aluminum cooking utensil, comprising forming the handle-attaching member of an aluminum base alloy containing about 15 per cent silicon, and electrically spot welding it to the wrought aluminum utensil.

3. An article of manufacture, comprising a wrought aluminum cooking utensil, and a cast handle-attaching member formed of an aluminum base alloy containing from about 7 per cent to 20 per cent silicon, the handle-attaching member being electrically spot welded to the utensil.

4. An article of manufacture, comprising a wrought aluminum cooking utensil, and a cast handle-attaching member formed of an aluminum base alloy containing about 15 per cent silicon, the handle-attaching member being electrically spot welded to the utensil.

5. The method of securely attaching an article to a wrought aluminum member, comprising casting the article of an aluminum base alloy containing from about 7 per cent to 20 per cent silicon, and electrically spot welding said article to the wrought aluminum member.

In testimony whereof we hereunto sign our names.

JOHN H. WILSON,
IRVING W. WOOD.